United States Patent
Paddon et al.

(10) Patent No.: US 8,943,571 B2
(45) Date of Patent: Jan. 27, 2015

(54) METHOD AND APPARATUS FOR PROTECTING A SINGLE SIGN-ON DOMAIN FROM CREDENTIAL LEAKAGE

(75) Inventors: Michael W. Paddon, Tokyo (JP); Jessica M. Flanagan, Ashfield (AU); Craig M. Brown, Harbord (AU)

(73) Assignee: QUALCOMM Incorporated, San Diego, CA (US)

(*) Notice: Subject to any disclaimer, the term of this patent is extended or adjusted under 35 U.S.C. 154(b) by 114 days.

(21) Appl. No.: 13/252,931

(22) Filed: Oct. 4, 2011

(65) Prior Publication Data

US 2013/0086656 A1 Apr. 4, 2013

(51) Int. Cl.
| | |
|---|---|
| H04L 29/06 | (2006.01) |
| G01S 19/32 | (2010.01) |
| G01S 19/24 | (2010.01) |
| G01S 19/42 | (2010.01) |
| G01S 19/48 | (2010.01) |
| H04W 4/02 | (2009.01) |

(52) U.S. Cl.
CPC ............ *G01S 19/32* (2013.01); *G01S 19/246* (2013.01); *G01S 19/421* (2013.01); *G01S 19/48* (2013.01); *H04L 63/0815* (2013.01); *H04W 4/02* (2013.01)
USPC .................................................. 726/8; 726/6

(58) Field of Classification Search
None
See application file for complete search history.

(56) References Cited

U.S. PATENT DOCUMENTS

| | | | |
|---|---|---|---|
| 6,763,468 B2 * | 7/2004 | Gupta et al. ............... 726/2 |
| 7,174,383 B1 | 2/2007 | Biswas et al. | |
| 7,188,181 B1 * | 3/2007 | Squier et al. ............... 709/228 |
| 7,296,290 B2 | 11/2007 | Barriga et al. | |
| 7,503,031 B2 * | 3/2009 | Chang et al. ............... 717/101 |
| 7,802,295 B2 | 9/2010 | Murase et al. | |
| 2004/0111621 A1 * | 6/2004 | Himberger et al. ......... 713/182 |
| 2006/0085345 A1 * | 4/2006 | Khandelwal et al. ....... 705/51 |
| 2007/0044146 A1 * | 2/2007 | Murase et al. ............... 726/10 |

(Continued)

FOREIGN PATENT DOCUMENTS

| | | |
|---|---|---|
| WO | 2007076074 A2 | 7/2007 |
| WO | WO-2009126209 A2 | 10/2009 |

OTHER PUBLICATIONS

Grob, Thomas, "Security analysis of the SAML single sign-on browser/artifact profile," Proceedings of the 19th Annual Computer Security Applications Conference, Dec. 2003, pp. 298-307.

(Continued)

*Primary Examiner* — Samson Lemma
*Assistant Examiner* — Malcolm Cribbs
(74) *Attorney, Agent, or Firm* — Won Tae Kim

(57) ABSTRACT

Disclosed is a method for protecting a single sign-on domain from credential leakage. In the method, an authentication server provides an authentication cookie to a browser client. The cookie has at least one user authentication credential for the domain, and is associated with an authentication subdomain of the domain. The server receives the cookie from the browser client. Upon authentication of the user authentication credential in the received cookie, the server responds to the access request by forwarding, to the browser client, a limited-use cookie for the domain. The server receives a request from the content server to validate a session identifier of the limited-use cookie received from the browser client. Upon validation of the session identifier of the limited-use cookie, the server provides a valid session message to the content server for enabling the content server to forward requested content to the browser client.

32 Claims, 3 Drawing Sheets

(56) References Cited

U.S. PATENT DOCUMENTS

| | | |
|---|---|---|
| 2008/0184354 A1 | 7/2008 | Yamazaki |
| 2009/0126000 A1* | 5/2009 | Andreev et al. .................. 726/8 |
| 2011/0264913 A1* | 10/2011 | Nikander et al. ............. 713/168 |

OTHER PUBLICATIONS

Pfitzmann, et al., "Token-based web single signon with enabled clients," Computer Science, Apr. 2011. pp. 1-11.

Dunne, C., "Build and implement a single sign-on solution", Nov. 8, 2010, XP055049042, Retrieved from the Internet: URL:http://web.archive.org/web/20101108160239/http://www.ibm.com/developerworks/web/library/wa-singlesign/#resources [retrieved on Jan. 9, 2013] the whole document.

Hines, B., et al., "IBM Web Sphere Session Management", Mar. 23, 2006, XP055049080, Retrieved from the Internet: URL:http://web.archive.org/web/20060323193212/http://www.ibmpressbooks.com/articles/article.asp?p=332851&seqNum=2 [retrieved on Jan. 9, 2013] the whole document.

International Search Report and Written Opinion—PCT/US2012/058789—ISA/EPO—Jan. 30, 2013.

Taiwan Search Report—TW101136700—TIPO—Jul. 4, 2014.

* cited by examiner

METHOD AND APPARATUS FOR PROTECTING A SINGLE SIGN-ON DOMAIN FROM CREDENTIAL LEAKAGE

BACKGROUND

1. Field

The present invention relates generally to protecting a single sign-on domain from credential leakage.

2. Background

Single sign-on techniques allows an authorized user to access protected subdomain websites under a shared domain based on one sign-on transaction with one of the protected subdomain websites. In a typical single sign-on technique, a user accessing a protected subdomain website is authenticated and connected to a website that provides a session cookie to the user's browser. The session cookie allows the user to have access, in addition to the subdomain website, to all websites under the domain.

However, every host of a subdomain website, and every script running on every host must be trusted in order for the user authentication to remain secure. A rogue website operating at another subdomain under the protected domain, and visited by a user, can collect the user's session cookie from the user's browser. The leaked user's credential in the session cookie can be reused to obtain illicit access to other protected internal websites of subdomains under the domain.

There is therefore a need for a technique for protecting a single sign-on domain from credential leakage.

SUMMARY

An aspect of the invention may reside in a method for protecting a single sign-on domain from credential leakage. In the method, an authentication server provides an authentication cookie to a user browser client. The authentication cookie has at least one user authentication credential for the single sign-on domain, and is associated with an authentication subdomain of the single sign-on domain. The authentication server receives the authentication cookie in an access request from the browser client. The access request is based on a redirection received by the user browser client from a content server within the single sign-on domain in response to a content request from the user browser client. Upon authentication of the user authentication credential in the received authentication cookie, the authentication server responds to the access request by forwarding, to the user browser client, a limited-use cookie for the single sign-on domain. The authentication server receives a request from the content server to validate a session identifier of the limited-use cookie. The content server received the limited-use cookie from the user browser client. Upon validation of the session identifier of the limited-use cookie, the authentication server provides a valid session message to the content server for enabling the content server to forward requested content to the user browser client.

In more detailed aspects of the invention, the limited-use cookie may be a one-time use cookie. Upon validation of the session identifier of the limited-use cookie, the authentication server may invalidate the limited-use cookie to prohibit further use of the limited-use cookie. The limited-use cookie may have a short expiration time. The short expiration time may comprise about one minute. The content server may comprise a subdomain of the single sign-on domain. The limited-use cookie may be only valid for the content server's subdomain. The session identifier may comprise a one-time session key.

Another aspect of the invention may reside in an authentication server, comprising: means for providing an authentication cookie to a user browser client, wherein the authentication cookie has at least one user authentication credential for the single sign-on domain, and is associated with an authentication subdomain of the single sign-on domain; means for receiving the authentication cookie in an access request from the browser client, wherein the access request is based on a redirection received by the user browser client from a content server within the single sign-on domain in response to a content request from the user browser client; means for responding to the access request, upon authentication of the user authentication credential in the received authentication cookie, by forwarding, to the user browser client, a limited-use cookie for the single sign-on domain; means for receiving a request from the content server to validate a session identifier of the limited-use cookie, wherein the content server received the limited-use cookie from the user browser client; and means for providing, upon validation of the session identifier of the limited-use cookie, a valid session message to the content server for enabling the content server to forward requested content to the user browser client.

Another aspect of the invention may reside in an authentication server, comprising: a processor configured to: provide an authentication cookie to a user browser client, wherein the authentication cookie has at least one user authentication credential for the single sign-on domain, and is associated with an authentication subdomain of the single sign-on domain; receive the authentication cookie in an access request from the browser client, wherein the access request is based on a redirection received by the user browser client from a content server within the single sign-on domain in response to a content request from the user browser client; respond to the access request, upon authentication of the user authentication credential in the received authentication cookie, by forwarding, to the user browser client, a limited-use cookie for the single sign-on domain; receive a request from the content server to validate a session identifier of the limited-use cookie, wherein the content server received the limited-use cookie from the user browser client; and provide, upon validation of the session identifier of the limited-use cookie, a valid session message to the content server for enabling the content server to forward requested content to the user browser client.

Another aspect of the invention may reside in a computer program product comprising computer-readable medium, comprising: code for causing a computer to provide an authentication cookie to a user browser client, wherein the authentication cookie has at least one user authentication credential for the single sign-on domain, and is associated with an authentication subdomain of the single sign-on domain; code for causing a computer to receive the authentication cookie in an access request from the browser client, wherein the access request is based on a redirection received by the user browser client from a content server within the single sign-on domain in response to a content request from the user browser client; code for causing a computer to respond to the access request, upon authentication of the user authentication credential in the received authentication cookie, by forwarding, to the user browser client, a limited-use cookie for the single sign-on domain; code for causing a computer to receive a request from the content server to validate a session identifier of the limited-use cookie, wherein the content server received the limited-use cookie from the user browser client; and code for causing a computer to provide, upon validation of the session identifier of the limited-use cookie, a valid session message to the content server for enabling the content server to forward requested content to the user browser client.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
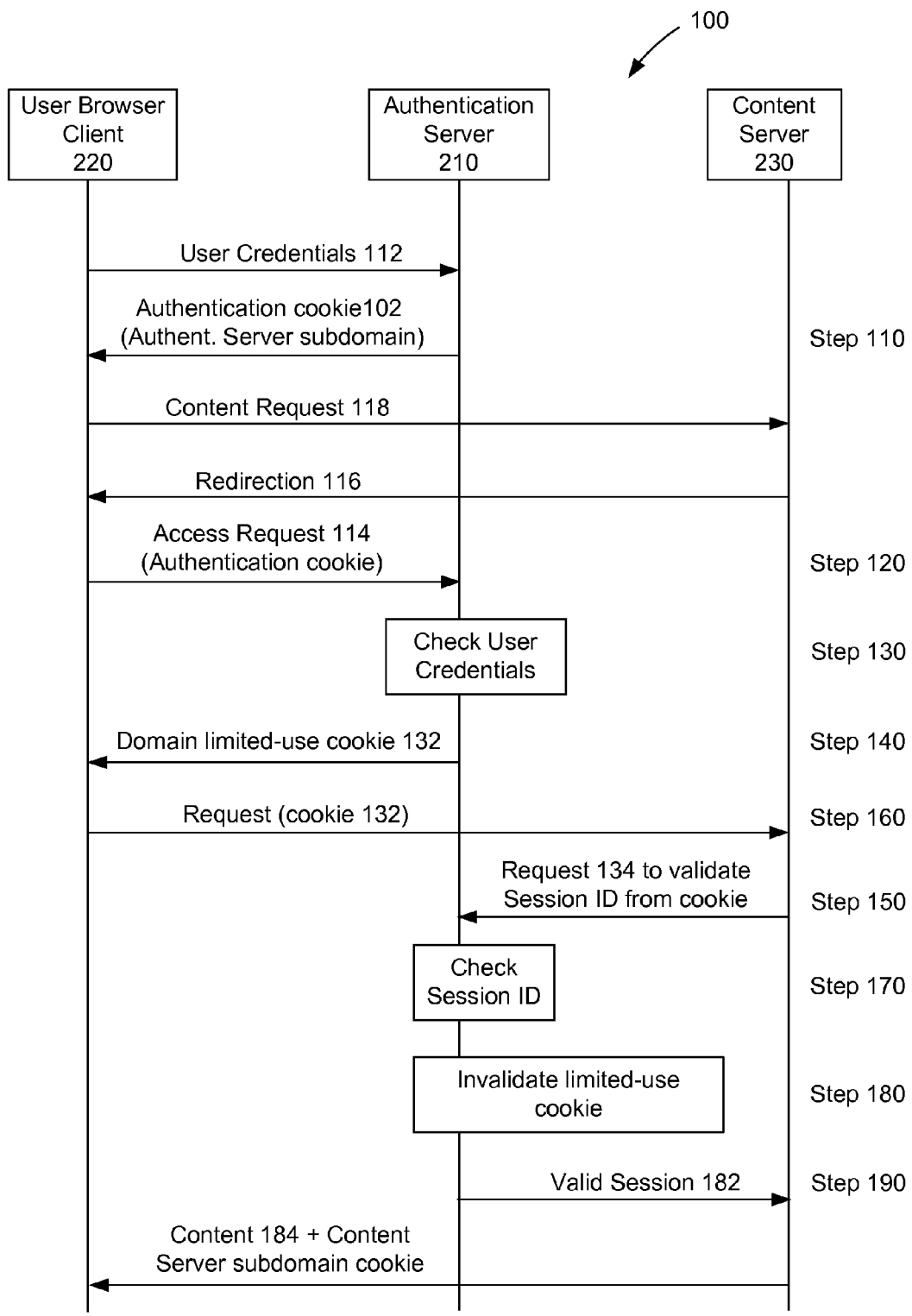
FIG. 1 is a flow diagram of a method for protecting a single sign-on domain from credential leakage, according to the present invention.
Figure 2:
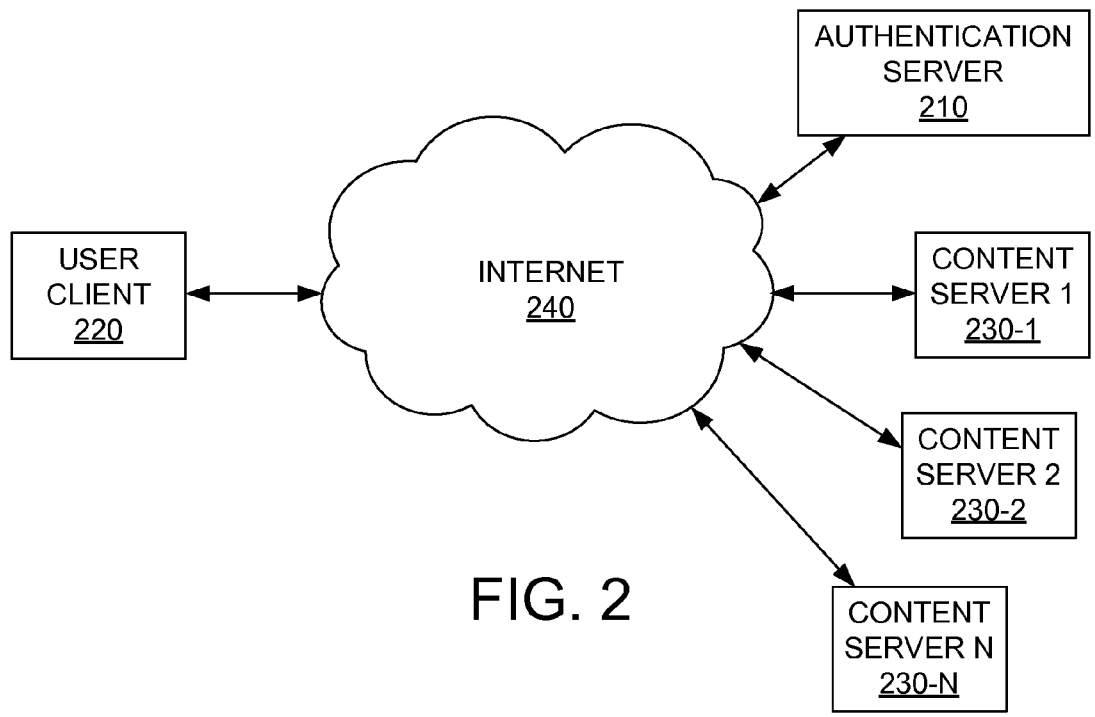
FIG. 2 is a block diagram showing a user browser client coupled to the internet enabling communications with an authentication server and a plurality of content servers.

With reference to FIGS. 1 and 2, an aspect of the invention may reside in a method 100 for protecting a single sign-on domain from credential leakage. In the method, an authentication server 210 provides an authentication cookie 102 to a user browser client 220 (step 110). The authentication cookie has at least one user authentication credential 112 for the single sign-on domain, and is associated with an authentication subdomain of the single sign-on domain. The authentication server receives the authentication cookie in an access request 114 from the browser client (step 120). The access request is based on a redirection 116 received by the user browser client from a content server 230 within the single sign-on domain in response to a content request 118 from the user browser client. Upon authentication of the user authentication credential in the received authentication cookie (step 130), the authentication server responds to the access request by forwarding, to the user browser client, a limited-use cookie 132 for the single sign-on domain (step 140). The authentication server receives a request 134 from the content server to validate a session identifier of the limited-use cookie (step 150). The content server received the limited-use cookie from the user browser client (step 160). Upon validation of the session identifier of the limited-use cookie (step 170), the authentication server provides a valid session message 182 to the content server for enabling the content server to forward requested content 184 to the user browser client (step 190).

In more detailed aspects of the invention, the limited-use cookie 132 may be a one-time use cookie. Upon validation of the session identifier of the limited-use cookie (step 150), the authentication server may invalidate the limited-use cookie to prohibit further use of the limited-use cookie (step 180). The limited-use cookie may have a short expiration time. The short expiration time may comprise about one minute. The limited-use cookie may be specific to a particular content server 230. The content server may comprise a subdomain of the single sign-on domain. The limited-use cookie may be only valid for the content server's subdomain. The session identifier may comprise a one-time session key.

Figure 3:
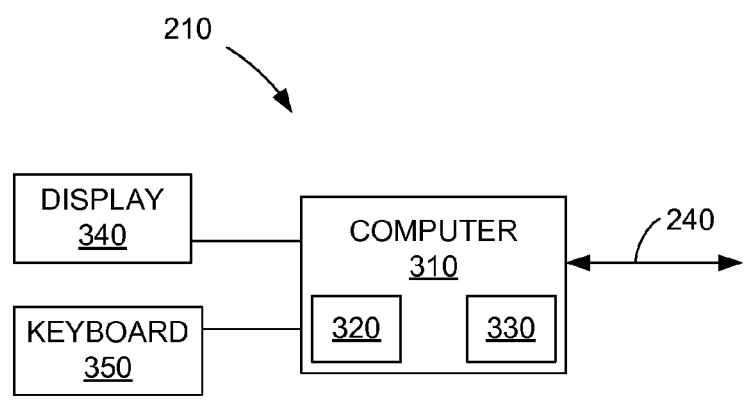
FIG. 3 is a block diagram showing an example of a computer for implementing an authentication server.

With additional reference to FIG. 3, a station comprising the authentication server 210 may be a computer 310 that includes a processor 320, memory 330 (and/or disk drives), a display 340, and keypad or keyboard 350. Similarly, another station comprising the user client 220 may be a computer that includes a processor, memory (and/or disk drives), a display, and keypad or keyboard. The user client computer may also include a microphone, speaker(s), camera, web browser software, and the like. Further, the stations may also include USB, Ethernet and similar interfaces, for communicating over a network, such as the internet 240.

Figure 4:
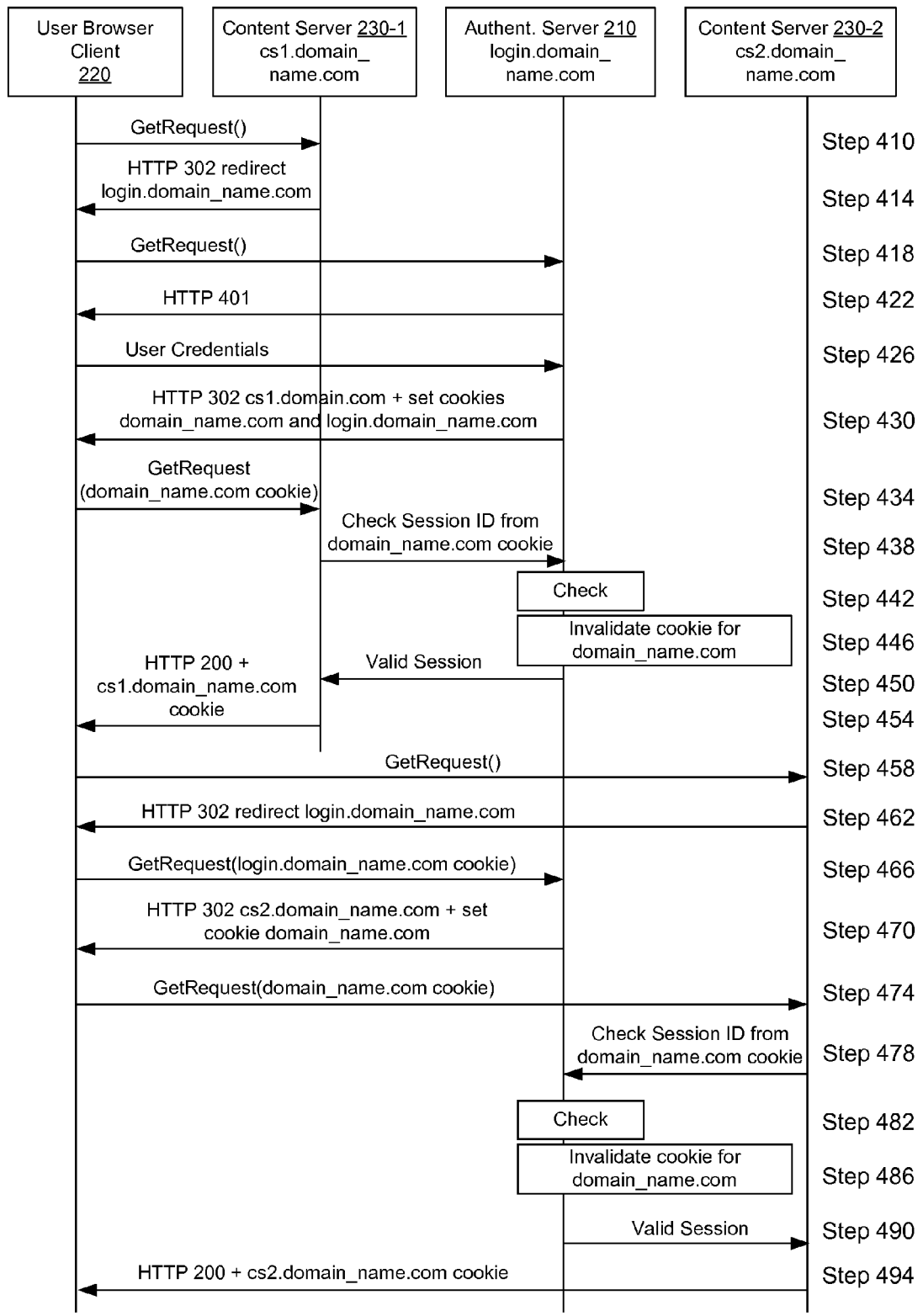
FIG. 4 is another flow diagram of a method for protecting a single sign-on domain from credential leakage, according to the present invention.

With particular reference to FIG. 4, the invention may be embodied in another method for protecting a single sign-on domain from credential leakage to a rogue server using the shared domain name. The method may use a domain level (e.g., domain_name.com) cookie to authenticate subdomain servers, and then may generate separate subdomain specific cookies. For single sign-on, a user browser client 220 requesting access to a website hosted by a first content server 230-1 (step 410) at a subdomain (e.g., cs1.domain_name.com) within the domain may be redirected to the authentication server 210 which uses the subdomain: login.domain_name.com (step 414). The authentication server may receive the redirection request and then procures the user's credentials for the domain (step 418, 422 and 426).

Ideally, the authentication server may generate cookies for specific lower level subdomains (e.g., cs1.domain-name.com). However a cookie cannot be set for a non-matching subdomain name. Instead, the authentication server may generate a one-time session key in a limited-use cookie (such as a one-time use cookie) for the domain: domain_name.com. In addition, the authentication server may generate an authentication-server-specific cookie for the subdomain: login.domain_name.com, and provide the cookies to the browser client (step 430). When the user's browser client first gives the domain_name.com cookie to the website it wants to access (step 434), the website may check that session with the authentication server (step 438 and 442). The authentication invalidates that session to prevent reuse of the cookie (step 446), and then indicates to the website that the session was valid (step 450). The website then knows it is safe to give the user browser client a session cookie for its lower level subdomain (step 454).

If the user browser client 220 wishes to authenticate against a website in another subdomain hosted by a second content server 230-2 (step 458), it may be redirected to the authentication server 210 (step 462). The user browser client may provide the earlier obtained (step 430) login.domain_name.com cookie to the authentication server which may return a new one-time use cookie for the domain: domain_name.com (steps 466 and 470). As with the first content server (steps 434-454), the new one-time use cookie may be used by the second content server to authenticate the user browser client by inquiry to the authentication server and provides the requested content (step 474-494). Now that the user browser client has the subdomain cookie from the second content server, it does not need to re-authenticate within that subdomain (cs2.domain-name.com) during the session.

The limited-use aspect of the domain_name.com cookie prevents another website from replaying the domain_name.com cookie to gain access to a protected website. If the invalidated domain_name.com cookie is reused, the second authentication attempt would fail and that user would be prompted for their credentials.

Additionally, to prevent wasting time sending an invalidated cookie, the domain_name.com cookies are generated with short expiration times. Although the method of the invention increases the number of messages passed, it does not require any additional action on behalf of the user.

Since the only cookies that are valid for more than one connection are the subdomain specific cookies, the method may be more secure as these cookies are not sent to websites of other subdomains within the single sign-on domain. Thus, credential leakage to, for example, a rogue website may be prevented since the cookie for the login.domain_name.com subdomain is not provided to any websites or servers other than the authentication server.

Another aspect of the invention may reside in an authentication server 210, comprising: means 310 for providing an authentication cookie 102 to a user browser client 220, wherein the authentication cookie has at least one user authentication credential 112 for the single sign-on domain, and is associated with an authentication subdomain of the single sign-on domain; means 310 for receiving the authentication cookie in an access request 114 from the browser client, wherein the access request is based on a redirection 116 received by the user browser client from a content server 230 within the single sign-on domain in response to a content request 118 from the user browser client; means 310 for responding to the access request, upon authentication of the user authentication credential in the received authentication cookie, by forwarding, to the user browser client, a limited-use cookie 132 for the single sign-on domain; means 310 for receiving a request 134 from the content server to validate a session identifier of the limited-use cookie, wherein the content server received the limited-use cookie from the user browser client; and means 310 for providing, upon validation of the session identifier of the limited-use cookie, a valid session message 182 to the content server for enabling the content server to forward requested content 184 to the user browser client.

Another aspect of the invention may reside in an authentication server, comprising: a processor 320 configured to: provide an authentication cookie 102 to a user browser client 220, wherein the authentication cookie has at least one user authentication credential 112 for the single sign-on domain, and is associated with an authentication subdomain of the single sign-on domain; receive the authentication cookie in an access request 114 from the browser client, wherein the access request is based on a redirection 116 received by the user browser client from a content server 230 within the single sign-on domain in response to a content request 118 from the user browser client; respond to the access request, upon authentication of the user authentication credential in the received authentication cookie, by forwarding, to the user browser client, a limited-use cookie 132 for the single sign-on domain; receive a request 134 from the content server to validate a session identifier of the limited-use cookie, wherein the content server received the limited-use cookie from the user browser client; and provide, upon validation of the session identifier of the limited-use cookie, a valid session message 182 to the content server for enabling the content server to forward requested content 184 to the user browser client.

Another aspect of the invention may reside in a computer program product comprising computer-readable medium 330, comprising: code for causing a computer 310 to provide an authentication cookie 102 to a user browser client, wherein the authentication cookie has at least one user authentication credential 112 for the single sign-on domain, and is associated with an authentication subdomain of the single sign-on domain; code for causing a computer 310 to receive the authentication cookie in an access request 114 from the browser client, wherein the access request is based on a redirection 116 received by the user browser client from a content server 230 within the single sign-on domain in response to a content request 118 from the user browser client; code for causing a computer 310 to respond to the access request, upon authentication of the user authentication credential in the received authentication cookie, by forwarding, to the user browser client, a limited-use cookie 132 for the single sign-on domain; code for causing a computer 310 to receive a request 134 from the content server to validate a session identifier of the limited-use cookie, wherein the content server received the limited-use cookie from the user browser client; and code for causing a computer 310 to provide, upon validation of the session identifier of the limited-use cookie, a valid session message 182 to the content server for enabling the content server to forward requested content 184 to the user browser client.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary embodiments, the functions described may be implemented in hardware, software, firmware, or any combination thereof. If implemented in software as a computer program product, the functions may be stored on as one or more instructions or code on a computer-readable medium. Computer-readable media includes computer storage media that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer-readable medium may be non-transitory such that it does not include a transitory, propagating signal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for protecting a single sign-on domain, comprising:
   providing, by an authentication server, an authentication cookie to a user browser client, wherein the authentication cookie has at least one user authentication credential for the single sign-on domain, and is associated with an authentication subdomain of the single sign-on domain;
   receiving, by the authentication server, the authentication cookie in an access request from the user browser client, wherein the access request is based on a redirection received by the user browser client from a content server within the single sign-on domain in response to a content request from the user browser client;
   upon authentication of the user authentication credential in the received authentication cookie, responding, by the authentication server, to the access request by forwarding, to the user browser client, a limited-use cookie for the single sign-on domain;
   receiving, by the authentication server, a request from the content server to validate a session identifier of the limited-use cookie, wherein the content server received the limited-use cookie from the user browser client;
   upon validation of the session identifier of the limited-use cookie, providing, by the authentication server, a valid session message to the content server for enabling the content server to forward requested content to the user browser client and
   upon validation of the session identifier of the limited-use cookie, invalidating, by the authentication server, the limited-use cookie to prohibit further use of the limited-use cookie.

2. A method as defined in claim 1, wherein the limited-use cookie comprises a one-time use cookie.

3. A method as defined in claim 1, wherein the limited-use cookie has a expiration time.

4. A method as defined in claim 3, wherein the expiration time comprises about one minute.

5. A method as defined in claim 1, wherein the content server comprises a subdomain of the single sign-on domain.

6. A method as defined in claim 5, wherein the limited-use cookie is only valid for the content server's subdomain.

7. A method as defined in claim 1, wherein the session identifier comprises a one-time session key.

8. An authentication server, comprising:
   means for providing an authentication cookie to a user browser client, wherein the authentication cookie has at least one user authentication credential for the single sign-on domain, and is associated with an authentication subdomain of the single sign-on domain;
   means for receiving the authentication cookie in an access request from the user browser client, wherein the access request is based on a redirection received by the user browser client from a content server within the single sign-on domain in response to a content request from the user browser client;
   means for responding to the access request, upon authentication of the user authentication credential in the received authentication cookie, by forwarding, to the user browser client, a limited-use cookie for the single sign-on domain;
   means for receiving a request from the content server to validate a session identifier of the limited-use cookie, wherein the content server received the limited-use cookie from the user browser client;
   means for providing, upon validation of the session identifier of the limited-use cookie, a valid session message to the content server for enabling the content server to forward requested content to the user browser client; and
   means for invalidating, upon validation of the session identifier of the limited-use cookie, the limited-use cookie to prohibit further use of the limited-use cookie.

9. An authentication server as defined in claim 8, wherein the limited-use cookie comprises a one-time use cookie.

10. An authentication server as defined in claim 8, wherein the limited-use cookie has a expiration time.

11. An authentication server as defined in claim 10, wherein the expiration time comprises about one minute.

12. An authentication server as defined in claim 8, wherein the content server comprises a subdomain of the single sign-on domain.

13. An authentication server as defined in claim 12, wherein the limited-use cookie is only valid for the content server's subdomain.

14. An authentication server as defined in claim 8, wherein the session identifier comprises a one-time session key.

15. An authentication server, comprising:
   a processor configured to:
      provide an authentication cookie to a user browser client, wherein the authentication cookie has at least one user authentication credential for the single sign-on domain, and is associated with an authentication subdomain of the single sign-on domain;
      receive the authentication cookie in an access request from the user browser client, wherein the access request is based on a redirection received by the user browser client from a content server within the single sign-on domain in response to a content request from the user browser client;
      respond to the access request, upon authentication of the user authentication credential in the received authentication cookie, by forwarding, to the user browser client, a limited-use cookie for the single sign-on domain;

receive a request from the content server to validate a session identifier of the limited-use cookie, wherein the content server received the limited-use cookie from the user browser client;

provide, upon validation of the session identifier of the limited-use cookie, a valid session message to the content server for enabling the content server to forward requested content to the user browser; and invalidate, upon validation of the session identifier of the limited-use cookie, the limited-use cookie to prohibit further use of the limited-use cookie.

16. An authentication server as defined in claim 15, wherein the limited-use cookie comprises a one-time use cookie.

17. An authentication server as defined in claim 15, wherein the limited-use cookie has a expiration time.

18. An authentication server as defined in claim 17, wherein the expiration time comprises about one minute.

19. An authentication server as defined in claim 15, wherein the content server comprises a subdomain of the single sign-on domain.

20. An authentication server as defined in claim 19, wherein the limited-use cookie is only valid for the content server's subdomain.

21. An authentication server as defined in claim 15, wherein the session identifier comprises a one-time session key.

22. A computer program product, comprising:
non-transitory computer-readable medium, comprising:
  code for causing a computer to provide an authentication cookie to a user browser client, wherein the authentication cookie has at least one user authentication credential for the single sign-on domain, and is associated with an authentication subdomain of the single sign-on domain;
  code for causing a computer to receive the authentication cookie in an access request from the user browser client, wherein the access request is based on a redirection received by the user browser client from a content server within the single sign-on domain in response to a content request from the user browser client;
  code for causing a computer to respond to the access request, upon authentication of the user authentication credential in the received authentication cookie, by forwarding, to the user browser client, a limited-use cookie for the single sign-on domain;
  code for causing a computer to receive a request from the content server to validate a session identifier of the limited-use cookie, wherein the content server received the limited-use cookie from the user browser client;
  code for causing a computer to provide, upon validation of the session identifier of the limited-use cookie, a valid session message to the content server for enabling the content server to forward requested content to the user browser client; and
  code for causing a computer to invalidate, upon validation of the session identifier of the limited-use cookie, the limited-use cookie to prohibit further use of the limited-use cookie.

23. A computer program product as defined in claim 22, wherein the limited-use cookie comprises a one-time use cookie.

24. A computer program product as defined in claim 22, wherein the limited-use cookie has a expiration time.

25. A computer program product as defined in claim 24, wherein the expiration time comprises about one minute.

26. A computer program product as defined in claim 22, wherein the content server comprises a subdomain of the single sign-on domain.

27. A computer program product as defined in claim 26, wherein the limited- use cookie is only valid for the content server's subdomain.

28. A computer program product as defined in claim 22, the session identifier comprises a one-time session key.

29. A method as defined in claim 1, wherein:
the single sign-on domain is associated with a domain name; and
the authentication subdomain is associated with a subdomain name that includes the domain name.

30. An authentication server as defined in claim 8, wherein:
the single sign-on domain is associated with a domain name; and
the authentication subdomain is associated with a subdomain name that includes the domain name.

31. An authentication server as defined in claim 15, wherein:
the single sign-on domain is associated with a domain name; and
the authentication subdomain is associated with a subdomain name that includes the domain name.

32. A computer program product as defined in claim 22, wherein:
the single sign-on domain is associated with a domain name; and
the authentication subdomain is associated with a subdomain name that includes the domain name.

* * * * *